Figure 1:
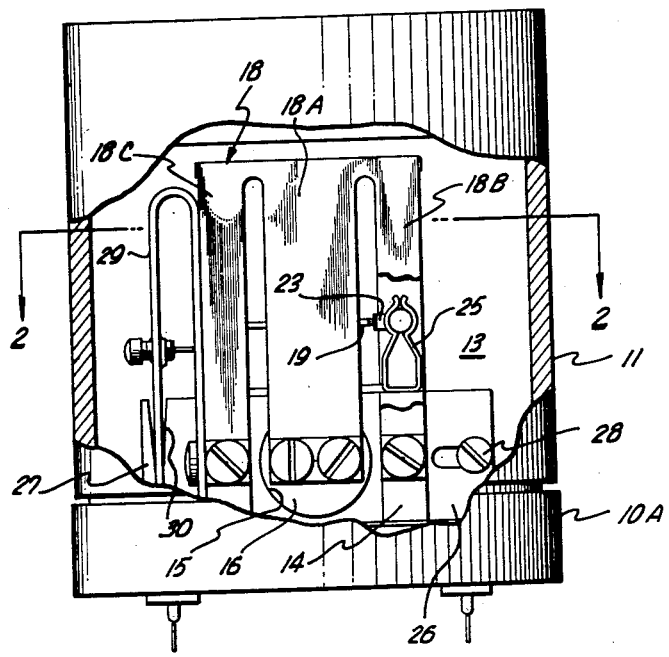

Nov. 28, 1961

R. L. PITZER ET AL 3,010,324

ACCELEROMETER

Filed Jan. 27, 1958

2 Sheets-Sheet 1

INVENTORS.
ROBERT L. PITZER
EDWARD H. REHNBORG

BY
Christie, Parker & Hale
ATTORNEYS.

INVENTORS.
ROBERT L. PITZER
EDWARD H. REHNBORG
BY
*Christie, Parker & Hale*
ATTORNEYS.

United States Patent Office 3,010,324
Patented Nov. 28, 1961

3,010,324
ACCELEROMETER
Robert L. Pitzer, Arcadia, and Edward H. Rehnborg, San Gabriel, Calif., assignors to Edcliff Instruments, Inc., Monrovia, Calif., a corporation of California
Filed Jan. 27, 1958, Ser. No. 711,191
4 Claims. (Cl. 73—497)

This invention relates to an accelerometer and particularly to an accelerometer whose response to acceleration is limited to a single degree of freedom.

In a spring-mass accelerometer, it is desirable that both maximum insensitivity to transverse or cross acceleration forces and a controlled frequency response over a wide range of ambient temperatures be incorporated in the instrument. The former characteristic improves the precision of the instrument while the latter characteristic improves the versatility and effective usefulness of the instrument.

Insensitivity to transverse acceleration forces can be attained where the movement of the mass is constrained so as to be limited to one degree of freedom and where the effects of secondary masses on the responses of the spring-mass system are minimized.

In order to improve the frequency response of an accelerometer, a damping means is frequently employed. Damping by liquid friction provides an effective and convenient damping method, and one particularly suited for instruments such as accelerometers. However, since damping by liquid friction is achieved by absorbing the energy of masses according to the principles of fluid friction, such damping is sensitive to changes in the temperature of the liquid where no temperature compensating means are employed. This is because temperature changes affect the viscosity of the damping liquid and therefore affect the degree of restraining force exerted by the liquid on the mass.

Our invention provides an accelerometer in which a high degree of precision is attained. Responses due to acceleration forces or vibrations transverse to the acceleration force of interest are avoided and constant damping action is attained despite variations in temperature of the damping liquid.

The invention is an accelerometer comprising a base which is traversed by an elongated tunnel or bore. A mass is fitted within the bore so as to be movable within it. A main spring having elements joined to the base and to opposite ends of the mass allows displacement of the mass along the longitudinal axis of the bore responsive to an acceleration force. Means are provided to sense displacement of the mass relative to the base.

The invention also encompasses an accelerometer as described above having in addition a fluid-tight enclosure filled with a means yieldably resistive to displacement of the mass. A flow controlling means is fitted in the base and circumscribes the periphery of the mass to form an orifice area between the mass and the flow controlling means. Means are included by which changes in the orifice area responsive to changes in temperature are effectuated.

By fitting the mass within a bore in the base, movement of the mass is limited to acceleration forces acting in a single degree of freedom. Accordingly, transverse acceleration forces produce no spurious electrical signals.

The temperature sensitive means adapted to vary the orifice area between the mass and the flow controlling means produces a constant damping action despite variations in temperature of the damping liquid. This is because each change in viscosity of the damping fluid induced by temperature changes is compensated by a correcting change in the orifice area. For example, as the temperature increases, the viscosity of the damping fluid decreases. This reduces the magnitude of the liquid friction and, consequently, the magnitude of the force retarding movements of the mass. To maintain constant damping action, the retarding force upon the mass is maintained constant by decreasing the orifice area. The increased resistance to flow resulting from the decreased area of the orifice balances the decreased resistance to flow resulting from the reduced viscosity of the liquid. A constant damping action is thereby produced irrespective of temperature changes.

Figure 2:
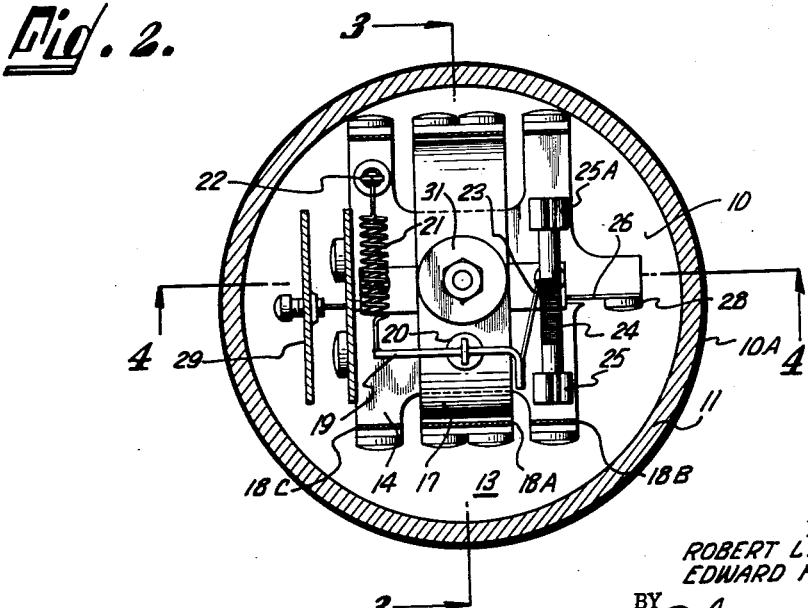
Figure 3:
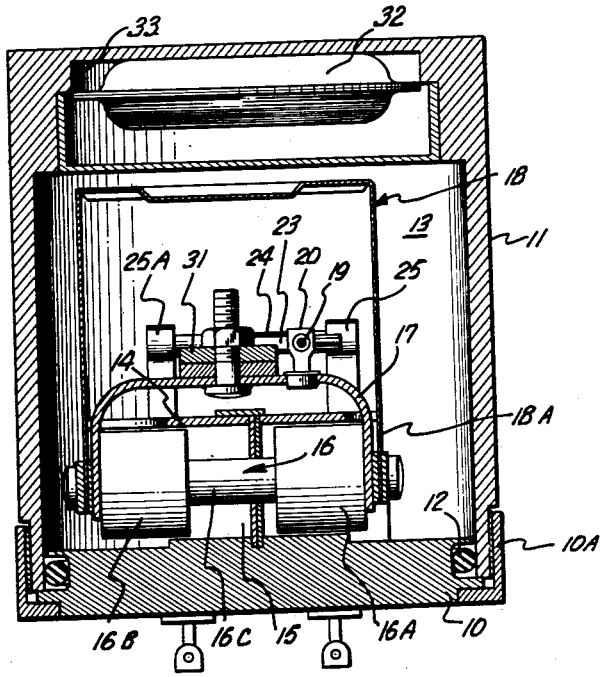
Figure 4:
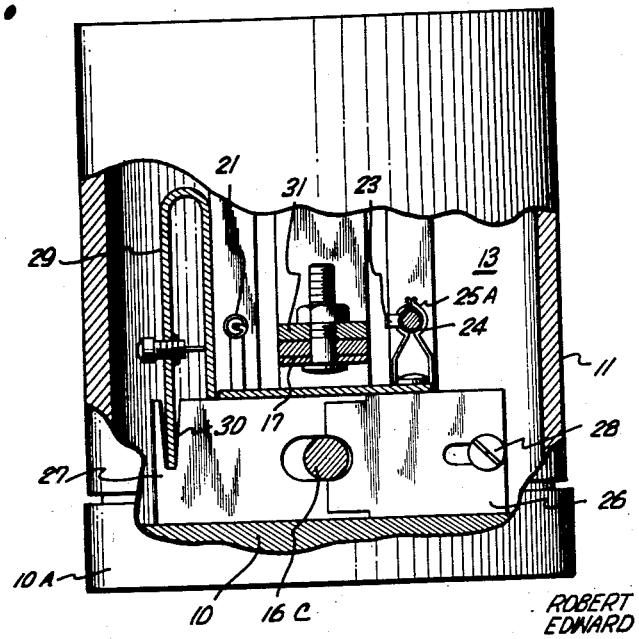

The accelerometer of the invention will be more clearly understood from the following description made in conjunction with the accompanying drawings, in which:

FIG. 1 is an elevation of the accelerometer partially cut away;
FIG. 2 is a sectional plan view taken along lines 2—2 of FIG. 1;
FIG. 3 is a sectional elevation taken along lines 3—3 of FIG. 2; and
FIG. 4 is another sectional elevation taken along lines 4—4 of FIG. 2.

With reference to FIGS. 1, 2, 3 and 4, the accelerometer comprises a base 10 joined by a ring 10A to a housing 11. An O ring 12 provides a fluid-tight seal between the base and the housing so that a main enclosure 13 is formed between the base and the interior of the housing. The main enclosure is filled with a damping liquid.

A ground piece 14 is joined centrally to the base and projects into the main enclosure. It is rectangularly shaped with two slots formed in opposed sides, thereby giving the ground piece an H-shape. An elongated cylindrical bore or tunnel 15 of uniform diameter traverses the cross-bar of the H-shaped ground piece from one side to the other. A mass 16 is fitted within the bore so as to be movable within the bore. The mass comprises two end sections 16A and 16B, each having a diameter only slightly less than the diameter of the bore. In the preferred embodiment, a clearance of 0.003 to 0.005 inch is provided between the mass and the wall of the bore. The mass, therefore, can move with only one degree of freedom, namely, along the longitudinal axis of the bore. The minimum clearance provided between the end sections and the bore wall provides a damping liquid seal. The end sections are joined by a shaft 16C having a diameter substantially less than the diameter of the bore. The total length of the mass is greater than the length of the bore so that a part of each end section protrudes from opposite ends of the bore. A connecting bridge 17 formed by a metal strip is arched to pass over the ground piece and is joined at each of its longitudinal ends to opposite ends of the mass. The connecting bridge therefore becomes a part of the mass and moves in the same manner and with the same degree of freedom as the mass itself.

A main spring 18 joins the movable mass to a ground system comprising the ground piece, the base and the housing. The main spring is formed from a single piece of flexible material to provide two opposite parallel members joined together at one end by a horizontal member. Two slots are made for a portion of the length of each upright member so that each upright member is divided into three strips, a middle strip 18A and two outer strips 18B and 18C. As particularly shown in FIG. 1, the middle strip of each upright member is joined to opposite ends of the mass while each of the outer strips is joined to the legs of the H-shaped ground piece on opposite sides. In this manner, the mass is joined to the ground system by a spring without bearings and substantially frictionless. The spring is preferably made of NiSpan "C," a flexible material whose elastic modulus does not change with temperature.

As particularly shown in FIG. 2, a metallic support 19 mounted normal to the longitudinal axis of the tunnel is held by a bracket 20 joined to the connecting bridge. One end of the support is joined through a connecting spring 21 to an electrical terminal 22. The other end of the support is joined to a brush or contact arm 23 which is maintained in contact with a resistance wire coil 24 of a potentiometer system. The resistance wire coil is supported by two element holders 25 and 25A. Movements of the connecting bridge responsive to movements of the mass cause the contact arm to move along the length of the resistance wire coil, thereby varying the electrical output of the potentiometric system. The variations in electrical output may be calibrated as a function of the acceleration force required to produce a given displacement.

The electrical connection to the contact arm is made through the metallic support, the connecting spring and electrical terminal 22. While not shown, suitable terminals for making the other electrical connections required for the potentiometer circuit are provided.

The manner in which constant damping action is attained in the accelerometer of the invention is most clearly shown in FIGS. 3 and 4. As previously described, the shaft between the end sections of the mass has a diameter substantially less than the diameter of the bore. The annular space between the shaft and the wall of the bore is filled with the same damping liquid as is placed in the main enclosure.

As previously explained, constant damping action is achieved in the accelerometer of the invention by adjusting the size of an orifice area to balance changes in viscosity of the damping fluid caused by temperature changes. The orifice area is formed by a fixed damping vane 26 and a correcting damping vane 27. The fixed damping vane comprises a sheet material, such as brass, fitted in a vertical slot cut on one side of the ground piece normal to the longitudinal axis of the bore. The correcting damping vane is fitted in a similar slot cut on the opposite side of the ground piece. Each vane intersects the bore and has on one end an arcuate cut fitted to the curvature of the shaft of the mass. The arcuate cut of each vane can be adjusted to engage the shaft from opposite sides so as to stop almost all damping liquid flow between the regions formed on the two sides of the vanes. In addition, the arcuate cut of each vane may be adjusted in position so that various orifice areas between the shaft periphery and the vanes are created. These orifice areas control the flow of damping fluid between the two regions on opposite sides of the vanes when movement of the mass produces a piston action by the end sections.

The position of the fixed damping vane can be adjusted by means of a hold-down screw 28. Its position is set initially to provide a specified damping ratio at a fixed temperature for various materials and accelerometer ranges.

The position of the correcting damping vane is varied responsive to temperature variations. The position of the correcting damping vane is adjusted by a bi-metallic spring 29 formed from a sheet of two thermally dissimilar metals laminated together. The bi-metallic spring is formed in the shape of a horseshoe with the bend of the horseshoe being at the top. One arm of the horseshoe is placed in a notch 30 formed in the portion of the correcting damping vane projecting beyond the ground piece. Movement of the bi-metallic strip responsive to temperature changes causes a movement of the correcting damping vane either inwardly or outwardly. For example, upon a decrease in temperature, the arm of the bi-metallic spring within the notch tends to move outwardly. This movement causes a horizontal force to act upon the correcting damping vane so as to cause the damping vane to move outwardly from the bore. This increases the orifice area between the shaft and the vane. Upon an increase in temperature, the arm of the bi-metallic strip moves to cause the correcting vane to move inwardly, thereby decreasing the orifice area. In this manner, as previously dscribed, the total retarding force on the end sections of the mass is maintained as a constant despite temperature variations. A constant damping action is thereby attained.

A ranging weight 31 is joined to the connecting bridge. This weight serves as an initial calibration means and acts to bring the accelerometer within the particular acceleration range desired. The amount of weight necessary for this purpose is determined initially and no subsequent alteration of the ranging weight is required once the instrument has been assembled.

As a damping fluid, a silicone-type fluid is used. In order to compensate for expansion of the damping fluid due to temperature changes, an expansion pad 32 is mounted within an expansion chamber 33. The expansion chamber is joined to the main enclosure by means of several ports (not shown). The expansion pad is generally a metallic element such as a pressure capsule which is sufficiently resilient to expand and contract corresponding to such changes in the volume of the fluid.

In the preferred embodiment described above, a potentiometric system was described as a means of sensing displacement of the mass due to acceleration forces. It is apparent that other displacement sensing means may be employed consistent with the basic concept of the invention. For example, a differential transformer may be adapted so that displacement of the mass results in movement of the magnetic core coupling the primary and secondary windings of the transformer. In this manner the electrical output may be calibrated to indicate the magnitude of the acceleration force producing the displacement. While a modification of the orifice arrangement might be required where a single transformer coil is employed, the same principles would be applied. Where two transformer coils, placed on opposite ends of the mass, are employed, the same orifice arrangement can be employed as described in conjunction with the potentiometer system.

In addition to providing an instrument insensitive to cross acceleration forces and possessing an increased dynamic frequency range as the result of constant damping action, the accelerometer of the invention possesses other advantages. Since the mass is totally enclosed, it is protected from damage where an excessive force is applied. Therefore, a thinner spring can be employed. The use of a thinner spring makes possible a lower range instrument and is advantageous in that the hysteresis is measurably reduced through the use of such a spring. In addition, the use of secondary masses is minimized in the design according to the invention so that cross acceleration effects upon the secondary masses are eliminated.

We claim:

1. An accelerometer comprising a housing, a base joined to the housing to form a fluid-tight enclosure, a ground piece joined to the base and projecting into the enclosure, the ground piece being traversed by a cylindrical bore, a mass having end sections with a diameter slightly less than the diameter of the bore and a central section having a diameter less than the end sections, a main spring having elements joined to the ground piece and to opposite ends of the mass to allow displacement of the mass relative to the base along the longitudinal axis of the bore responsive to acceleration forces, a damping fluid within the enclosure, a fixed vane fitted in the ground piece and having a cut-out portion adapted to fit a part of the periphery of the central section of the mass, a damping vane slidably movable in a slot in the ground piece and having a cut-out portion adapted to fit a part of the periphery of the central section of the mass, the fixed vane and the damping vane intersecting the bore at substantially opposite points, a temperature-sensitive means adapted to move the damping vane responsive to variations in temperature, and means adapted to sense displacement of the mass relative to the base.

2. An accelerometer comprising a housing, a base joined to the housing to form a fluid-tight enclosure, a ground piece joined to the base and projecting into the enclosure, the ground piece being traversed by a cylindrical bore, a mass having cylindrical end sections with a diameter slightly less than the diameter of the bore and a connecting shaft having a diameter less than the end sections, a main spring having elements joined to the ground piece and to opposite ends of the mass to allow displacement of the mass relative to the base along only the longitudinal axis of the bore responsive to acceleration forces, a damping fluid within the enclosure, a fixed vane positioned in the ground piece in a plane normal to the longitudinal axis of the bore and projecting into the bore, the projecting edge having a semi-circular cut adapted to fit the curvature of the connecting shaft of the mass, a damping vane positioned oppositely to the fixed vane and slidably movable in a slot in the ground piece the damping vane having one edge projecting into the bore with a semi-circular cut fitted to the curvature of the connecting shaft of the mass and a notch near the edge opposite to the projecting edge, a temperature-sensitive means adapted to move the damping vane responsive to variations in temperature, and means adapted to sense displacement of the mass relative to the base.

3. Apparatus in accordance with claim 2 wherein the temperature-sensitive means is a bi-metallic strip fitted into the notch in the damping vane and shaped so that variations in temperature cause lateral movement of the strip and act to cause responsive movements of the damping vane either into the bore or out from the bore.

4. An accelerometer comprising a base traversed by a bore, a mass within the bore having end sections slidably fitted within the bore and a central section of reduced cross-section defining an annular space between the bore and the central section of the mass, a main spring having elements joined to the base and to opposite ends of the mass to enable displacement of the mass relative to the base along the longitudinal axis of the bore responsive to acceleration, a damping fluid within the annular space, a first vane fixed to the base and having a portion adapted to fit a part of the periphery of the central section of the mass, a second vane slidably movable in the base and having a portion adapted to fit a part of the periphery of the central section of the mass, the first and second vanes being disposed in the bore to cooperatively form a fluid flow constriction around said central section, temperature-sensitive means adapted to the second vane to move it so as to vary the cross-sectional area of the fluid flow constriction in inverse relation to the temperature of the damping fluid, and means for sensing displacement of the mass relative to the base.

References Cited in the file of this patent

UNITED STATES PATENTS

| | | |
|---|---|---|
| 2,332,994 | Draper et al. | Oct. 26, 1943 |
| 2,533,226 | Davis et al. | Dec. 12, 1950 |
| 2,570,672 | Hathaway | Oct. 9, 1951 |
| 2,587,443 | Crabtree | Feb. 26, 1952 |
| 2,640,900 | Klose | June 2, 1953 |
| 2,702,186 | Head et al. | Feb. 15, 1955 |
| 2,764,658 | Statham | Sept. 25, 1956 |
| 2,831,670 | Bourns et al. | Apr. 22, 1958 |
| 2,854,539 | Ruppel | Sept. 30, 1958 |

FOREIGN PATENTS

| | | |
|---|---|---|
| 881,642 | France | Jan. 28, 1943 |